US012091758B2

(12) United States Patent
Farandos et al.

(10) Patent No.: US 12,091,758 B2
(45) Date of Patent: Sep. 17, 2024

(54) INTEGRATED HYDROGEN PRODUCTION METHOD AND SYSTEM

(71) Applicant: Utility Global, Inc., Houston, TX (US)

(72) Inventors: Nicholas Farandos, Bray (IE); Matthew Dawson, Katy, TX (US); Jin Dawson, Katy, TX (US)

(73) Assignee: UTILITY GLOBAL, INC., Houston, TX (US)

( * ) Notice: Subject to any disclaimer, the term of this patent is extended or adjusted under 35 U.S.C. 154(b) by 281 days.

(21) Appl. No.: 17/741,587

(22) Filed: May 11, 2022

(65) Prior Publication Data

US 2022/0372635 A1 Nov. 24, 2022

Related U.S. Application Data

(60) Provisional application No. 63/188,200, filed on May 13, 2021.

(51) Int. Cl.
C25B 1/042 (2021.01)
C21B 7/00 (2006.01)
C25B 9/19 (2021.01)
C25B 9/23 (2021.01)
C25B 11/031 (2021.01)
C25B 11/04 (2021.01)
C25B 13/07 (2021.01)
C25B 15/08 (2006.01)

(52) U.S. Cl.
CPC ............. *C25B 1/042* (2021.01); *C21B 7/002* (2013.01); *C25B 9/19* (2021.01); *C25B 9/23* (2021.01); *C25B 11/031* (2021.01); *C25B 11/04* (2013.01); *C25B 13/07* (2021.01); *C25B 15/08* (2013.01); *C21B 2100/00* (2013.01)

(58) Field of Classification Search
CPC ..................................................... C25B 1/042
See application file for complete search history.

(56) References Cited

U.S. PATENT DOCUMENTS 4,164,457 A 8/1979 Barnert et al.
5,693,212 A * 12/1997 Mazanec ............ B01J 19/2475
204/266

(Continued)

FOREIGN PATENT DOCUMENTS

WO WO-03/089117 A1 10/2003
WO WO-2019219340 A1 * 11/2019 ......... C21B 13/0073

(Continued)

OTHER PUBLICATIONS

International Search Report and Written Opinion issued for PCT/US2022/028720 dated Aug. 26, 2022.

*Primary Examiner* — Brian W Cohen
(74) *Attorney, Agent, or Firm* — Foley & Lardner LLP

(57) ABSTRACT

Herein discussed is a method of producing hydrogen comprising introducing a metal smelter effluent gas or a basic oxygen furnace (BOF) effluent gas or a mixture thereof into an electrochemical (EC) reactor, wherein the EC reactor comprises a mixed-conducting membrane. In an embodiment, the method comprises introducing steam into the EC reactor on one side of the membrane, wherein the effluent gas is on the opposite side of the membrane, wherein the effluent gas and the steam are separated by the membrane and do not come in contact with each other.

19 Claims, 4 Drawing Sheets

(56) References Cited

U.S. PATENT DOCUMENTS

| | | | |
|---|---|---|---|
| 10,358,662 B2* | 7/2019 | Simpson | C12M 45/07 |
| 2012/0171587 A1 | 7/2012 | Shindle et al. | |
| 2020/0140297 A1 | 5/2020 | Hall et al. | |
| 2020/0144627 A1 | 5/2020 | Hall et al. | |
| 2020/0144628 A1 | 5/2020 | Hall et al. | |
| 2020/0144633 A1 | 5/2020 | Hall et al. | |
| 2020/0144635 A1 | 5/2020 | Hall et al. | |
| 2020/0144646 A1 | 5/2020 | Hall et al. | |
| 2020/0144647 A1 | 5/2020 | Hall et al. | |
| 2020/0144648 A1 | 5/2020 | Hall et al. | |
| 2020/0144653 A1 | 5/2020 | Hall et al. | |
| 2020/0144654 A1 | 5/2020 | Hall et al. | |
| 2020/0156104 A1 | 5/2020 | Hall et al. | |
| 2020/0176803 A1 | 6/2020 | Hall et al. | |
| 2020/0182549 A1 | 6/2020 | Hall et al. | |
| 2020/0227763 A1 | 7/2020 | Hall et al. | |
| 2020/0235409 A1 | 7/2020 | Hall et al. | |
| 2020/0235410 A1 | 7/2020 | Hall et al. | |
| 2020/0255959 A1 | 8/2020 | Hall et al. | |
| 2020/0255962 A1 | 8/2020 | Hall et al. | |
| 2020/0255963 A1 | 8/2020 | Hall et al. | |
| 2020/0259186 A1 | 8/2020 | Hall et al. | |
| 2020/0303749 A1 | 9/2020 | Hall et al. | |
| 2021/0024425 A1 | 1/2021 | Dawson et al. | |
| 2021/0069786 A1 | 3/2021 | Hall et al. | |
| 2021/0121978 A1 | 4/2021 | Dawson et al. | |
| 2021/0175531 A1 | 6/2021 | Farandos et al. | |
| 2022/0364245 A1 | 11/2022 | Farandos et al. | |
| 2022/0364251 A1 | 11/2022 | Dawson et al. | |
| 2022/0380210 A1 | 12/2022 | Farandos et al. | |
| 2022/0403532 A1 | 12/2022 | Farandos et al. | |
| 2023/0002915 A1 | 1/2023 | Dawson et al. | |
| 2023/0013911 A1 | 1/2023 | Dawson et al. | |
| 2023/0020427 A1 | 1/2023 | Farandos et al. | |
| 2023/0092683 A1 | 3/2023 | Farandos et al. | |
| 2023/0109683 A1 | 4/2023 | Dawson et al. | |
| 2023/0167560 A1 | 6/2023 | Dawson et al. | |
| 2023/0175143 A1 | 6/2023 | Farandos et al. | |
| 2024/0133052 A1 | 4/2024 | Matthews et al. | |
| 2024/0133062 A1 | 4/2024 | Dawson et al. | |

FOREIGN PATENT DOCUMENTS

| | | |
|---|---|---|
| WO | WO-2020/025815 A1 | 2/2020 |
| WO | WO-2020/146762 A1 | 7/2020 |

* cited by examiner

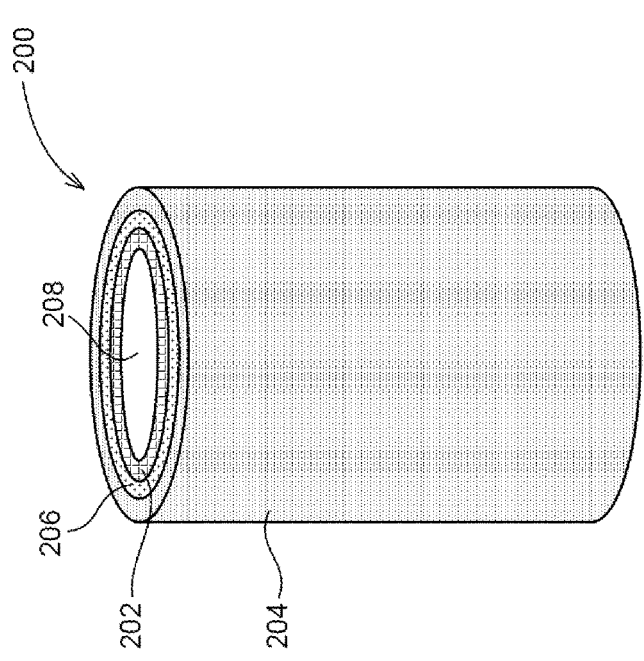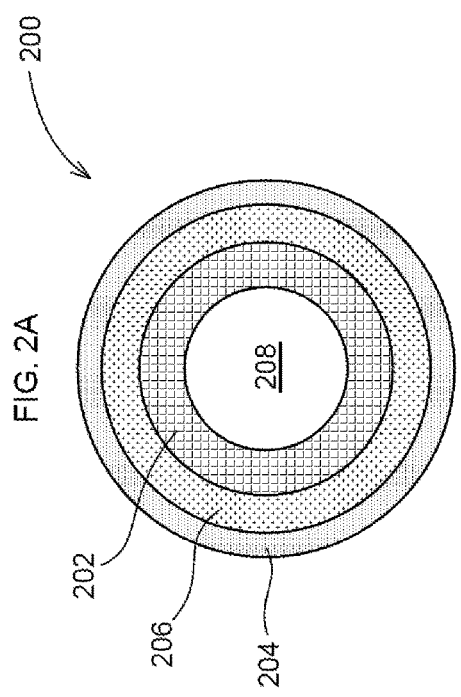
FIG. 2A
FIG. 2B

INTEGRATED HYDROGEN PRODUCTION METHOD AND SYSTEM

CROSS-REFERENCE TO RELATED APPLICATIONS

This application claims the benefit under 35 U.S.C. 119(e) of U.S. Provisional Patent Application No. 63/188,200 filed May 13, 2021, the entire disclosure of which is hereby incorporated herein by reference.

TECHNICAL FIELD

This invention generally relates to hydrogen production. More specifically, this invention relates to an electrochemical hydrogen production method and system.

BACKGROUND

Hydrogen in large quantities is needed in the petroleum and chemical industries. For example, large amounts of hydrogen are used in upgrading fossil fuels and in the production of ammonia or methanol or hydrochloric acid. Petrochemical plants need hydrogen for hydrocracking, hydrodesulfurization, hydrodealkylation. Hydrogenation processes to increase the level of saturation of unsaturated fats and oils also need hydrogen. Hydrogen is also a reducing agent of metallic ores. Hydrogen may be produced from electrolysis of water, steam reforming, lab-scale metal-acid process, thermochemical methods, or anaerobic corrosion. Many countries are aiming at a hydrogen economy.

Clearly there is increasing need and interest to develop new technological platforms to produce hydrogen. This disclosure discusses hydrogen production using efficient electrochemical pathways. The electrochemical reactor and the method to perform such reactions are discussed. In particular, this disclosure includes the discussion of methods and systems for hydrogen production integrated with a metal smelter or a basic oxygen furnace (BOF).

SUMMARY

Herein discussed is a method of producing hydrogen comprising introducing a metal smelter effluent gas or a basic oxygen furnace (BOF) effluent gas or a mixture thereof into an electrochemical (EC) reactor, wherein the EC reactor comprises a mixed-conducting membrane. In an embodiment, the method comprises introducing steam into the EC reactor on one side of the membrane, wherein the effluent gas is on the opposite side of the membrane, wherein the effluent gas and the steam are separated by the membrane and do not come in contact with each other.

In an embodiment, the EC reactor comprises an anode on the effluent gas side and a cathode on the steam side, wherein the anode and the cathode are separated by the membrane and are in contact with the membrane respectively. In an embodiment, the anode and the cathode are separated by the membrane and are both exposed to a reducing environment. In an embodiment, the anode and the cathode comprise Ni or NiO and a material selected from the group consisting of YSZ, CGO, SDC, SSZ, LSGM, and combinations thereof. In an embodiment, at least a portion of the cathode exhaust gas is recycled to enter the EC reactor on the cathode side.

In an embodiment, the membrane comprises an electronically conducting phase containing doped lanthanum chromite or an electronically conductive metal or combination thereof; and wherein the membrane comprises an ionically conducting phase containing a material selected from the group consisting of gadolinium or samarium doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, Co, Ru, or combinations thereof. In an embodiment, the membrane comprises CoCGO. In an embodiment, the membrane comprises LST (lanthanum-doped strontium titanate)-YSZ or LST-SSZ.

In an embodiment, the reactor comprises no interconnect. In an embodiment, the steam is reduced to hydrogen on the cathode side. In an embodiment, the effluent gas comprises CO and CO2, and wherein the mole ratio of CO/CO2 is no less than 1/5, or no less than 1/4, or no less than 1/3.

Also discussed herein is an integrated hydrogen production system comprising a metal smelter or a basic oxygen furnace (BOF) and an electrochemical reactor comprising a mixed conducting membrane that is both ionically and electronically conductive, wherein the reactor is capable of performing the water gas shift reactions electrochemically, wherein electrochemical water gas shift reactions involve the exchange of an ion through the membrane and include forward water gas shift reactions, or reverse water gas shift reactions, or both.

In an embodiment, the reactor comprises a first and a second porous electrodes that comprise metallic phase and ceramic phase, wherein the metallic phase is electronically conductive, and wherein the ceramic phase is ionically conductive. In an embodiment, the porous electrodes have no current collector attached. In an embodiment, the porous electrodes are separated by the mixed conducting membrane and are both exposed to a reducing environment.

In an embodiment, the reactor is configured to receive effluent gas from the metal smelter or the BOF or both. In an embodiment, the system comprises a gas holder between the reactor and the metal smelter or the BOF, wherein the gas holder is configured to receive effluent gas from the metal smelter or the BOF or both and introduce the effluent gas to the reactor. In an embodiment, the system comprises a steam generator, wherein the first porous electrode is configured to receive steam from the steam generator and the second porous electrode is configured to receive the effluent gas, wherein the steam and the effluent gas are separated by the mixed conducting membrane and do not come in contact with each other.

Further aspects and embodiments are provided in the following drawings, detailed description, and claims. Unless specified otherwise, the features as described herein are combinable and all such combinations are within the scope of this disclosure.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 2A illustrates a tubular electrochemical reactor, according to an embodiment of this disclosure.

FIG. 2B illustrates a cross section of a tubular electrochemical reactor, according to an embodiment of this disclosure.

DETAILED DESCRIPTION

Overview

Figure 1:
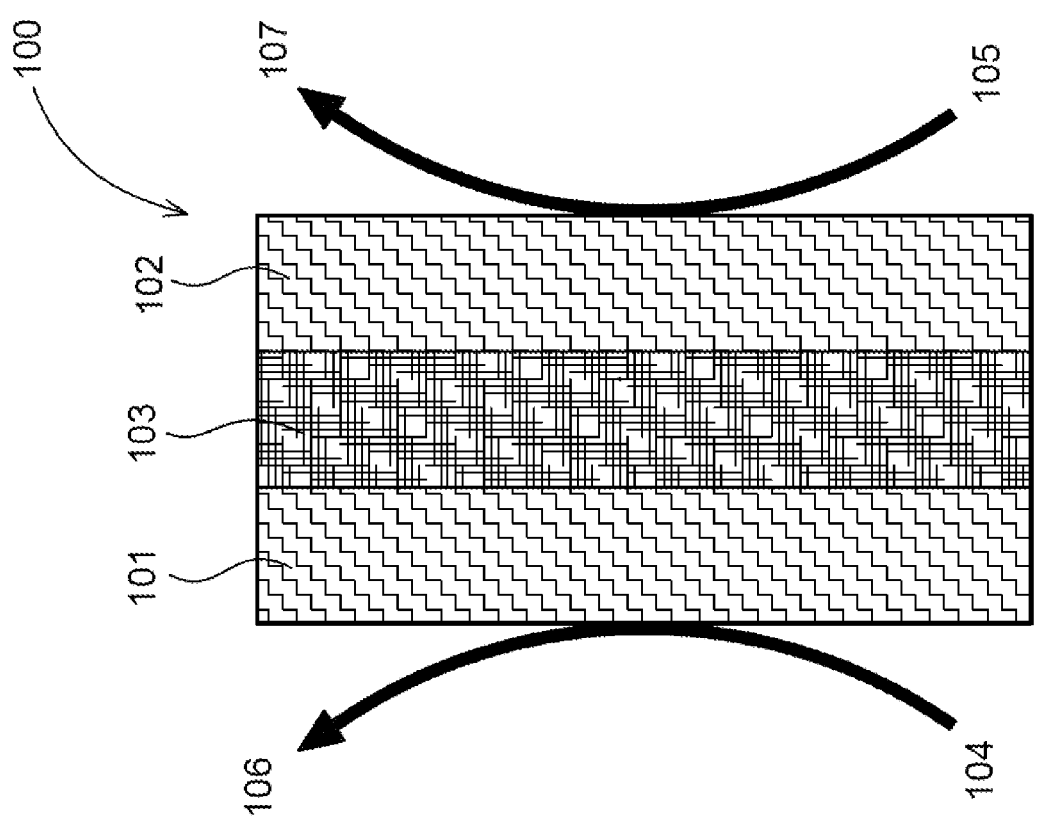
FIG. 1 illustrates an electrochemical (EC) reactor or an electrochemical gas producer, according to an embodiment of this disclosure.

The disclosure herein describes an electrochemical (EC) reactor or EC gas producer that is able to perform water gas shift reactions via electrochemical pathways. The EC reactor is also able to perform chemical water gas shift reactions. Such a reactor has many applications. For example, the EC reactor utilizes a high-temperature electrochemical process that is greatly suited to use waste gases from BF's and BOF's to produce $H_2$ directly from water. This produced $H_2$ may then be used directly in a blast furnace process to reduce the need for coal/petroleum coke and thus substantially reduce the net carbon dioxide emissions from the iron and steel manufacturing processes.

The following description recites various aspects and embodiments of the inventions disclosed herein. No particular embodiment is intended to define the scope of the invention. Rather, the embodiments provide non-limiting examples of various compositions and methods that are included within the scope of the claimed inventions. The description is to be read from the perspective of one of ordinary skill in the art. Therefore, information that is well-known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like. As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, compositions and materials are used interchangeably unless otherwise specified. Each composition/material may have multiple elements, phases, and components. Heating as used herein refers to actively adding energy to the compositions or materials.

In this disclosure, no substantial amount of $H_2$ means that the volume content of the hydrogen is no greater than 5%, or no greater than 3%, or no greater than 2%, or no greater than 1%, or no greater than 0.5%, or no greater than 0.1%, or no greater than 0.05%.

As used herein, CGO refers to Gadolinium-Doped Ceria, also known alternatively as gadolinia-doped ceria, gadolinium-doped cerium oxide, cerium(IV) oxide, gadolinium-doped, GDC, or GCO, (formula Gd:CeO2). CGO and GDC are used interchangeably unless otherwise specified. Syngas (i.e., synthesis gas) in this disclosure refers to a mixture consisting primarily of hydrogen, carbon monoxide and carbon dioxide.

As used herein, ceria refers to cerium oxide, also known as ceric oxide, ceric dioxide, or cerium dioxide, is an oxide of the rare-earth metal cerium. Doped ceria refers to ceria doped with other elements, such as samaria-doped ceria (SDC), or gadolinium-doped ceria (GDC or CGO). As used herein, chromite refers to chromium oxides, which includes all the oxidation states of chromium oxides.

A layer or substance being impermeable as used herein refers to it being impermeable to fluid flow. For example, an impermeable layer or substance has a permeability of less than 1 micro darcy, or less than 1 nano darcy.

In this disclosure, sintering refers to a process to form a solid mass of material by heat or pressure, or a combination thereof, without melting the material to the extent of liquefaction. For example, material particles are coalesced into a solid or porous mass by being heated, wherein atoms in the material particles diffuse across the boundaries of the particles, causing the particles to fuse together and form one solid piece.

Electrochemical Reactor

Electrochemistry is the branch of physical chemistry concerned with the relationship between electrical potential, as a measurable and quantitative phenomenon, and identifiable chemical change, with either electrical potential as an outcome of a particular chemical change, or vice versa. These reactions involve electrons moving between electrodes via an electronically-conducting phase (typically, but not necessarily, an external electrical circuit), separated by an ionically-conducting and electronically insulating membrane (or ionic species in a solution). When a chemical reaction is effected by a potential difference, as in electrolysis, or if electrical potential results from a chemical reaction as in a battery or fuel cell, it is called an electrochemical reaction. Unlike chemical reactions, in electrochemical reactions electrons (and necessarily resulting ions), are not transferred directly between molecules, but via the aforementioned electronically conducting and ionically conducting circuits, respectively. This phenomenon is what distinguishes an electrochemical reaction from a chemical reaction.

Contrary to conventional practice, an electrochemical reactor has been discovered, which comprises an ionically conducting membrane, wherein the reactor is capable of performing the water gas shift reactions electrochemically, wherein electrochemical water gas shift reactions involve the exchange of an ion through the membrane and include forward water gas shift reactions, or reverse water gas shift reactions, or both. This is different from water gas shift reactions via chemical pathways because chemical water gas shift reactions involve direct combination of reactants.

In an embodiment, the reactor comprises porous electrodes that comprise metallic phase and ceramic phase, wherein the metallic phase is electronically conductive and wherein the ceramic phase is ionically conductive. In various embodiments, the electrodes have no current collector attached to them. In various embodiments, the reactor does not contain any current collector. Clearly, such a reactor is fundamentally different from any electrolysis device or fuel cell.

In an embodiment, one of the electrodes in the reactor is an anode that is configured to be exposed to a reducing environment while performing oxidation reactions electrochemically. In various embodiments, the electrodes comprise Ni or NiO and a material selected from the group consisting of YSZ, CGO, SDC, SSZ, LSGM, and combinations thereof.

The electrochemical water gas shift reactions taking place in the reactor comprise electrochemical half-cell reactions, wherein the half-cell reactions are:

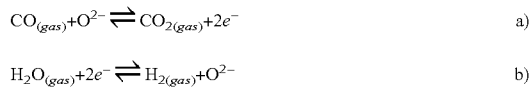

a) $CO_{(gas)} + O^{2-} \rightleftharpoons CO_{2(gas)} + 2e^-$ b) $H_2O_{(gas)} + 2e^- \rightleftharpoons H_{2(gas)} + O^{2-}$ In various embodiments, the half-cell reactions take place at triple phase boundaries, wherein the triple phase boundaries are the intersections of pores with the electronically conducting phase and the ionically conducting phase. Furthermore, the reactor is also capable of performing chemical water gas shift reactions.

In various embodiments, the ionically conducting membrane conducts protons or oxide ions. In various embodiments, the ionically conducting membrane comprises solid oxide. In various embodiments, the ionically conducting membrane is impermeable to fluid flow. In various embodiments, the ionically conducting membrane also conducts electrons and wherein the reactor comprises no interconnect.

In an embodiment, the membrane comprises an electronically conducting phase containing doped lanthanum chromite or an electronically conductive metal or combination thereof; and wherein the membrane comprises an ionically conducting phase containing a material selected from the group consisting of gadolinium or samarium doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, or combinations thereof.

Also discussed herein is a reactor comprising a bi-functional layer and a mixed conducting membrane; wherein the bi-functional layer and the mixed conducting membrane are in contact with each other, and wherein the bi-functional layer catalyzes reverse-water-gas-shift (RWGS) reaction and functions as an anode in an electrochemical reaction. In an embodiment, the bi-functional layer as the anode is exposed to a reducing environment and the electrochemical reaction taking place in the bi-functional layer is oxidation. In an embodiment, no current collector is attached to the bi-functional layer. In an embodiment, the bi-functional layer comprises Ni or NiO and a material selected from the group consisting of YSZ, CGO, SDC, SSZ, LSGM, and combinations thereof.

In an embodiment, the membrane comprises an electronically conducting phase containing doped lanthanum chromite or an electronically conductive metal or combination thereof; and wherein the membrane comprises an ionically conducting phase containing a material selected from the group consisting of gadolinium or samarium doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, or combinations thereof.

Such a reactor has various applications. In an embodiment, the reactor is utilized to produce carbon monoxide via hydrogenation of carbon dioxide. In another embodiment, the reactor is used to adjust syngas composition (i.e., $H_2/CO$ ratio) by converting $H_2$ to CO or converting CO to $H_2$. The following discussion takes hydrogen production as an example, but the application of the reactor is not limited to only hydrogen production.

FIG. 1 illustrates an electrochemical reactor or an electrochemical (EC) gas producer 100, according to an embodiment of this disclosure. EC gas producer device 100 comprises first electrode 101, membrane 103 a second electrode 102. First electrode 101 (also referred to as anode or bi-functional layer) is configured to receive a fuel 104. Stream 104 contains no oxygen. Second electrode 102 is configured to receive water (e.g., steam) as denoted by 105.

In an embodiment, device 100 is configured to receive CO, i.e., carbon monoxide (104) and to generate $CO/CO_2$ (106) at the first electrode (101); device 100 is also configured to receive water or steam (105) and to generate hydrogen (107) at the second electrode (102). In some cases, the second electrode receives a mixture of steam and hydrogen. Since water provides the oxide ion (which is transported through the membrane) needed to oxidize the CO at the opposite electrode, water is considered the oxidant in this scenario. As such, the first electrode 101 is performing oxidation reactions in a reducing environment. In various embodiments, 103 represents an oxide ion conducting membrane. In an embodiment, the first electrode 101 and the second electrode 102 may comprise Ni—YSZ or NiO—YSZ. In an embodiment, the oxide ion conducting membrane 103 also conducts electrons.

In an embodiment, device 100 is configured to simultaneously produce hydrogen 107 from the second electrode 102 and syngas 106 from the first electrode 101. In an embodiment, 104 represents methane and water or methane and carbon dioxide entering device 100. In other embodiments, 103 represents an oxide ion conducting membrane. In an embodiment, first electrode 101 and second electrode 102 may comprise Ni—YSZ or NiO—YSZ. Arrow 104 represents an influx of hydrocarbon and water or hydrocarbon and carbon dioxide. Arrow 105 represents an influx of water or water and hydrogen. In some embodiments, electrode 101 comprises Cu—CGO, or further optionally comprises CuO or $Cu_2O$ or combination thereof. Electrode 102 comprises Ni—YSZ or NiO—YSZ. Arrow 104 represents an influx of hydrocarbon with little to no water, with no carbon dioxide, and with no oxygen, and 105 represents an influx of water or water and hydrogen. Since water provides the oxide ion (which is transported through the membrane) needed to oxidize the hydrocarbon/fuel at the opposite electrode, water is considered the oxidant in this scenario.

In this disclosure, no oxygen means there is no oxygen present at first electrode 101 or at least not enough oxygen that would interfere with the reaction. Also, in this disclosure, water only means that the intended feedstock is water and does not exclude trace elements or inherent components in water. For example, water containing salts or ions is considered to be within the scope of water only. Water only also does not require 100% pure water but includes this embodiment. In embodiments, the hydrogen produced from second electrode 102 is pure hydrogen, which means that in the produced gas phase from the second electrode, hydrogen is the main component. In some cases, the hydrogen content is no less than 99.5%. In some cases, the hydrogen content is no less than 99.9%. In some cases, the hydrogen produced from the second electrode is the same purity as that produced from electrolysis of water.

In an embodiment, first electrode 101 is configured to receive methane and water or methane and carbon dioxide. In an embodiment, the fuel comprises a hydrocarbon having a carbon number in the range of 1-12, 1-10 or 1-8. Most preferably, the fuel is methane or natural gas, which is predominantly methane. In an embodiment, the device does not generate electricity and is not a fuel cell.

In various embodiments, the device does not contain a current collector. In an embodiment, the device comprises no interconnect. There is no need for electricity and such a device is not an electrolyser. The membrane 103 is configured to conduct electrons and as such is mixed conducting, i.e., both electronically conductive and ionically conductive. In an embodiment, the membrane 103 conducts oxide ions and electrons. In an embodiment, the electrodes 101, 102 and the membrane 103 are tubular (see, e.g., FIGS. 2A and 2B). In an embodiment, the electrodes 101, 102 and the membrane 103 are planar. In these embodiments, the electrochemical reactions at the anode and the cathode are spontaneous without the need to apply potential/electricity to the reactor.

In an embodiment, the electrochemical reactor (or EC gas producer) is a device comprising a first electrode, a second electrode, and a membrane between the electrodes, wherein the first electrode and the second electrode comprise a metallic phase that does not contain a platinum group metal when the device is in use, and wherein the membrane is oxide ion conducting. In an embodiment, wherein the first electrode comprises Ni or NiO and a material selected from the group consisting of YSZ, CGO, samaria-doped ceria (SDC), scandia-stabilized zirconia (SSZ), LSGM, and combinations thereof. In an embodiment, the first electrode is configured to receive a fuel. In an embodiment, said fuel comprises a hydrocarbon or hydrogen or carbon monoxide or combinations thereof.

In an embodiment, the second electrode comprises Ni or NiO and a material selected from the group consisting of yttria-stabilized zirconia (YSZ), ceria gadolinium oxide (CGO), samaria-doped ceria (SDC), scandia-stabilized zirconia (SSZ), lanthanum strontium gallate magnesite (LSGM), and combinations thereof. In an embodiment, the second electrode is configured to receive water and hydrogen and configured to reduce the water to hydrogen. In various embodiments, such reduction takes place electrochemically.

In an embodiment, the membrane comprises an electronically conducting phase containing doped lanthanum chromite or an electronically conductive metal or combination thereof; and wherein the membrane comprises an ionically conducting phase containing a material selected from the group consisting of gadolinium or samarium doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, or combinations thereof.

FIG. 2A illustrates (not to scale) a tubular electrochemical (EC) reactor or an EC gas producer 200, according to an embodiment of this disclosure. Tubular producer 200 includes an inner tubular structure 202, an outer tubular structure 204, and a membrane 206 disposed between the inner and outer tubular structures 202, 204, respectively. Tubular producer 200 further includes a void space 208 for fluid passage. FIG. 2B illustrates (not to scale) a cross section of a tubular producer 200, according to an embodiment of this disclosure. Tubular producer 200 includes a first inner tubular structure 202, a second outer tubular structure 204, and a membrane 206 between the inner and outer tubular structures 202, 204. Tubular producer 200 further includes a void space 208 for fluid passage.

In an embodiment, the electrodes and the membrane are tubular with the first electrode being outermost and the second electrode being innermost, wherein the second electrode is configured to receive water and hydrogen. In an embodiment, the electrodes and the membrane are tubular with the first electrode being innermost and the second electrode being outermost, wherein the second electrode is configured to receive water and hydrogen. In an embodiment, the electrodes and the membrane are tubular, wherein the first and second electrodes comprise Ni—YSZ or NiO—YSZ.

In an embodiment, the reactor comprises a catalyst that promotes chemical reverse water gas shift (RWGS) reactions. In an embodiment, the catalyst is a high temperature RWGS catalyst. In an embodiment, the catalyst is part of an anode in the reactor. In an embodiment, the catalyst is configured to be outside of the anode. For example, Ni—$Al_2O_3$ pellets as such a catalyst are placed in the reactor surrounding the tubes as shown in FIG. 2A and FIG. 2B. In an embodiment, the catalyst comprises Ni, Cu, Fe, Pt-group metals, or combinations thereof. In an embodiment, the catalyst comprises Pt, Cu, Rh, Ru, Fe, Ni, or combinations thereof.

Hydrogen Production System and Method

Disclosed herein is a method comprising providing a device comprising a first electrode, a second electrode, and a membrane between the electrodes, introducing a first stream to the first electrode, introducing a second stream to the second electrode, extracting hydrogen from the second electrode, wherein the first electrode and the second electrode comprise a metallic phase that does not contain a platinum group metal when the device is in use. In an embodiment, the membrane is oxide ion conducting.

In an embodiment, the device is operated at a temperature no less than 500° C., or no less than 600° C., or no less than 700° C., or no less than 750° C., or no less than 800° C., or no less than 850° C., or no less than 900° C., or no less than 950° C., or no less than 1000° C. In various embodiment, the pressure differential between the first electrode and the second electrode is no greater than 2 psi, or no greater than 1.5 psi, or no greater than 1 psi. In an embodiment, the first stream enters the device at a pressure of no greater than 10 psi, or no greater than 5 psi, or no greater than 3 psi. In an embodiment, the second stream enters the device at a pressure of no greater than 10 psi, or no greater than 5 psi, or no greater than 3 psi.

In an embodiment, the first stream comprises a fuel. In an embodiment, said fuel comprises a hydrocarbon or hydrogen or carbon monoxide or combinations thereof. In an embodiment, the first stream is directly introduced into the first electrode or the second stream is directly introduced into the second electrode or both. In an embodiment, the method comprises providing a reformer or a catalytic partial oxidation (CPDX) reactor upstream of the first electrode, wherein the first stream passes through the reformer or the CPDX reactor before being introduced to the first electrode, wherein the first electrode comprises Ni or NiO. In an embodiment, the reformer is a steam reformer or an autothermal reformer.

In an embodiment, the first stream comprises a fuel. In an embodiment, the fuel comprises a hydrocarbon or hydrogen or carbon monoxide or combinations thereof. In an embodiment, the second stream consists of water and hydrogen. In an embodiment, said first stream comprises carbon monoxide and no significant amount of hydrogen or hydrocarbon or water. In such cases, an upstream reformer is not needed. In this disclosure, no significant amount of hydrogen or hydrocarbon or water means that the volume content of the hydrogen or hydrocarbon or water is no greater than 5%, or no greater than 3%, or no greater than 2%, or no greater than 1%, or no greater than 0.5%, or no greater than 0.1%, or no greater than 0.05%.

In various embodiments, the first stream comprises no less than 50% of CO by volume, or no less than 60% of CO by volume, or no less than 70% of CO by volume, or no less than 80% of CO by volume, or no less than 90% of CO by volume. In an embodiment, the first stream comprises $CO_2$. In an embodiment, the first stream comprises syngas (CO and $H_2$). In an embodiment, the first stream comprises inert gases like argon or nitrogen. In an embodiment, the second stream consists of water and hydrogen.

In an embodiment, the method comprises using the extracted hydrogen in one of Fischer-Tropsch (FT) reactions, dry reforming reactions, Sabatier reaction catalyzed by nickel, Bosch reaction, reverse water gas shift reaction, electrochemical reaction to produce electricity, production of ammonia, production of fertilizer, electrochemical compressor for hydrogen storage, fueling hydrogen vehicles or hydrogenation reactions or combinations thereof.

Herein disclosed is a method of producing hydrogen comprising providing an electrochemical reactor, introducing a first stream comprising a fuel to the device, introducing a second stream comprising water to the device, reducing the water in the second stream to hydrogen, and extracting hydrogen from the device, wherein the first stream and the second stream do not come in contact with each other in the device. In various embodiments, the reduction from water to hydrogen takes place electrochemically. In an embodiment, the first stream does not come in contact with the hydrogen. In an embodiment, the first stream and the second stream are separated by a membrane in the device.

In an embodiment, the fuel comprises a hydrocarbon or hydrogen or carbon monoxide or combinations thereof. In an embodiment, the second stream comprises hydrogen. In an embodiment, the first stream comprises the fuel. In an embodiment, the fuel consists of carbon monoxide. In an embodiment, the first stream consists of carbon monoxide and carbon dioxide. In an embodiment, the second stream consists of water and hydrogen. In an embodiment, the second stream consists of steam and hydrogen.

Figure 3:
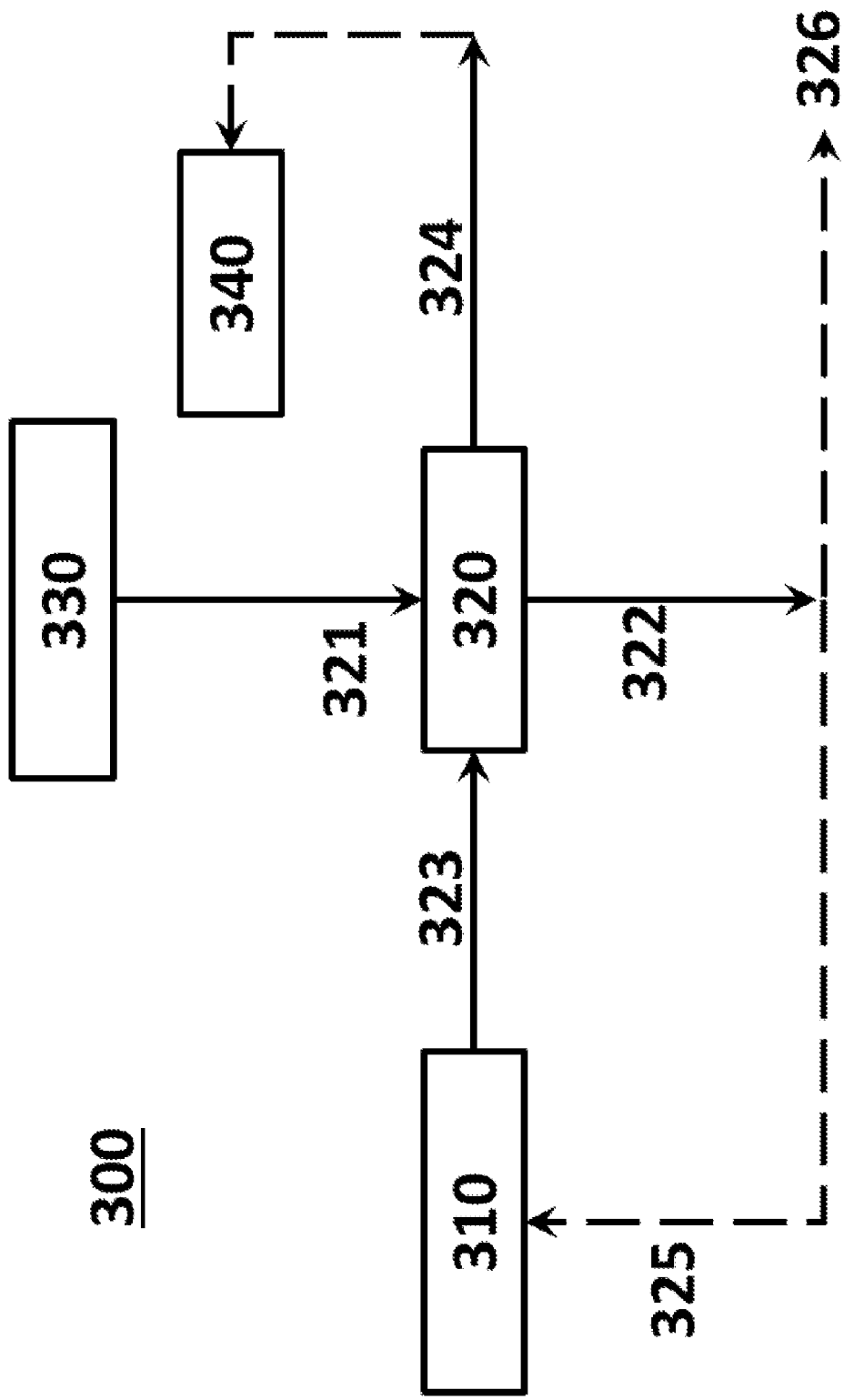
FIG. 3 illustrates an integrated hydrogen production system as discussed herein, according to an embodiment of this disclosure.

As illustrated in FIG. 3, an integrated hydrogen production system 300 is shown. The system comprises a metal smelter or a BOF 310; a steam generator 330; and an electrochemical (EC) reactor or gas producer 320. In various embodiments, the metal smelter is used to produce iron or steel. BOF (basic oxygen furnace) is known in the basic oxygen steelmaking process, which process is often referred to as BOS, BOP, or OSM. This process is also known as Linz-Donawitz-steelmaking or the oxygen converter process, in which carbon-rich molten pig iron is made into steel. The gas producer/EC reactor 320 generates a first product stream 324 (at the anode) comprising CO and $CO_2$ and a second product stream 322 (at the cathode) comprising $H_2$ and $H_2O$, wherein the two product streams do not come in contact with each other. The effluent stream 323 from the metal smelter or BOF enters the gas producer/EC reactor 320 and is used as fuel at the anode of the reactor (e.g., the CO contained in stream 323). The anode exhaust stream 324 has a higher content of $CO_2$ compared to that in stream 323 and potentially a certain amount of unreacted CO. Steam generator 330 provides steam 321 to the EC reactor or gas producer 320. Stream 323 and steam 321 do not come in contact with each other in the EC reactor; they are separated by a membrane in the reactor.

In some cases, system 300 comprises a carbon capture unit 340 and at least a portion of the first product stream 324 is sent to the carbon capture unit 340 to sequester $CO_2$. In an embodiment, a portion of the first product stream is used to generate steam from water, which optionally is combined with carbon capture, e.g., upstream of the carbon capture unit. In some cases, a portion of the second product stream 322 is recycled to enter the EC reactor (on the cathode side). In an embodiment, steam in the second product stream 322 is condensed and separated as water (e.g., stream 326) and the hydrogen is extracted. In some cases, at least a portion of the extracted hydrogen is used in the metal smelter or BOF 310 as represented by stream 325 in FIG. 3. In various embodiments, the EC reactor 320 comprises an ionically conducting membrane (not shown in FIG. 3), which membrane along with the anode enables the reactor to perform electrochemical water gas shift reactions, wherein electrochemical water gas shift reactions involve the exchange of an ion through the membrane and include forward water gas shift reactions, or reverse water gas shift reactions, or both. The anode also enables the reactor to perform chemical water gas shift reactions.

In various embodiments, the EC reactor oxidizes the effluent stream in a reducing environment and generates a first product stream comprising CO and $CO_2$, and wherein the EC reactor reduces steam to hydrogen electrochemically and generates a second product stream comprising $H_2$ and $H_2O$. In various embodiments, the membrane separates the first and second product streams. In various embodiments, at least a portion of the first product stream is utilized to produce steam from water. In various embodiments, at least a portion of the first product stream is sent to a carbon capture unit to sequester $CO_2$. In various embodiments, at least a portion of the second product stream is recycled to enter the EC reactor. In an embodiment, water is condensed and separated from the second product stream and hydrogen is extracted. The extracted hydrogen is used in the various applications as previously discussed herein. In addition, the extracted hydrogen is used to reduce metal ores. For example, the hydrogen is used in a blast furnace or a direct reduction process.

The steam generator produces steam from water. In an embodiment, the steam that enters the electrochemical reactor has a temperature of no less than 600° C., or no less than 700° C., or no less than 800° C., or no less than 850° C., or no less than 900° C., or no less than 950° C., or no less than 1000° C., or no less than 1100° C. In an embodiment, the steam that enters the electrochemical reactor has a pressure of no greater than 10 psi, or no greater than 5 psi, or no greater than 3 psi.

As such, hydrogen is produced via a method comprising: introducing steam and an effluent stream from a metal smelter or a BOF or both into an electrochemical (EC) reactor, wherein the effluent stream and the steam do not come in contact with each other in the EC reactor. The EC reactor comprises an ionically conducting membrane, wherein the reactor is capable of performing the water gas shift reactions electrochemically, wherein electrochemical water gas shift reactions involve the exchange of an ion through the membrane and include forward water gas shift reactions, or reverse water gas shift reactions, or both. Furthermore, the membrane separates the effluent stream from the steam. In various embodiment, the pressure differential between the effluent stream side and the steam side is no greater than 2 psi, or no greater than 1.5 psi, or no greater than 1 psi.

In an embodiment, at least a portion of the anode exhaust gas is used to produce steam from water. In an embodiment, at least a portion of the anode exhaust gas is sent to a carbon capture unit. In an embodiment, at least a portion of the cathode exhaust gas is recycled to enter the EC reactor on the cathode side. In an embodiment, at least a portion of the cathode exhaust gas is dehydrated to separate water from hydrogen.

In an embodiment, the membrane comprises an electronically conducting phase containing doped lanthanum chromite or an electronically conductive metal or combination thereof; and wherein the membrane comprises an ionically conducting phase containing a material selected from the group consisting of gadolinium or samarium doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, Co, Ru, or combinations thereof.

In an embodiment, the membrane comprises cobalt-CGO (CoCGO). In an embodiment, the membrane consists essentially of CoCGO. In an embodiment, the membrane consists of CoCGO. In an embodiment, the membrane comprises LST (lanthanum-doped strontium titanate)-YSZ or LST-SSZ. In this disclosure, LST-YSZ refers to a composite of LST and YSZ. In various embodiments, the LST phase and the YSZ phase percolate each other. In this disclosure, LST-SSZ refers to a composite of LST and SSZ. In various embodiments, the LST phase and the SSZ phase percolate each other. In an embodiment, the membrane consists essentially of LST-YSZ or LST-SSZ. In an embodiment, the membrane consists of LST-YSZ or LST-SSZ.

In an embodiment, the reactor comprises no interconnect. In an embodiment, the effluent gas comprises CO and $CO_2$, and wherein the mole ratio of $CO/CO_2$ is no less than 1/5, or no less than 1/4, or no less than 1/3. In an embodiment, the effluent gas has a temperature of no less than 700° C. or no less than 800° C. or no less than 900° C.

In an embodiment, the steam is reduced to hydrogen on the cathode side. In an embodiment, the method comprises using the hydrogen to reduce metal ores. In an embodiment, the method comprises dehydrating the cathode exhaust gas before using the hydrogen to reduce metal ores. In an embodiment, the hydrogen is used in a blast furnace or a direct reduction process.

Also discussed herein is an integrated hydrogen production system comprising a metal smelter or a basic oxygen furnace (BOF) and an electrochemical reactor comprising an ionically conducting membrane, wherein the reactor is capable of performing the water gas shift reactions electrochemically, wherein electrochemical water gas shift reactions involve the exchange of an ion through the membrane and include forward water gas shift reactions, or reverse water gas shift reactions, or both.

In various embodiments, the reactor is configured to receive effluent gas from the metal smelter or the BOF or both. In some embodiments, a gas holder (not shown in FIG. 3) is between the reactor and the metal smelter or the BOF. The gas holder is configured to contain the effluent gas from the metal smelter or the BOF or both and send the effluent gas to the reactor. In various embodiments, the gas holder is able to keep the gas at a desired temperature range (e.g., no less than 700° C.).

In an embodiment, the reactor comprises porous electrodes that comprise metallic phase and ceramic phase, wherein the metallic phase is electronically conductive, and wherein the ceramic phase is ionically conductive. In an embodiment, the electrodes have no current collector attached. In an embodiment, the electrodes are separated by the membrane and are both exposed to a reducing environment. In an embodiment, the electrodes comprise Ni or NiO and a material selected from the group consisting of YSZ, CGO, SDC, SSZ, LSGM, and combinations thereof.

In an embodiment, the electrochemical water gas shift reactions comprise electrochemical half-cell reactions, wherein the half-cell reactions are:

In an embodiment, wherein the half-cell reactions take place at triple phase boundaries, wherein the triple phase boundaries are the intersections of pores with the electronically conducting phase and the ionically conducting phase.

In an embodiment, the reactor is also capable of performing chemical water gas shift reactions. In an embodiment, the ionically conducting membrane conducts protons or oxide ions. In an embodiment, the ionically conducting membrane comprises a metal oxide. In an embodiment, the ionically conducting membrane is impermeable to fluid flow.

In an embodiment, the membrane comprises an electronically conducting phase containing doped lanthanum chromite or an electronically conductive metal or combination thereof; and wherein the membrane comprises an ionically conducting phase containing a material selected from the group consisting of gadolinium or samarium doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, Co, Ru, or combinations thereof.

In an embodiment, the ionically conducting membrane also conducts electrons and wherein the reactor comprises no interconnect. In an embodiment, the membrane comprises cobalt-CGO (CoCGO). In an embodiment, the membrane consists essentially of CoCGO. In an embodiment, the membrane consists of CoCGO. In an embodiment, the membrane comprises LST (lanthanum-doped strontium titanate)-YSZ or LST-SSZ. In an embodiment, the membrane consists essentially of LST-YSZ or LST-SSZ. In an embodiment, the membrane consists of LST-YSZ or LST-SSZ.

EXAMPLE

Figure 4A:
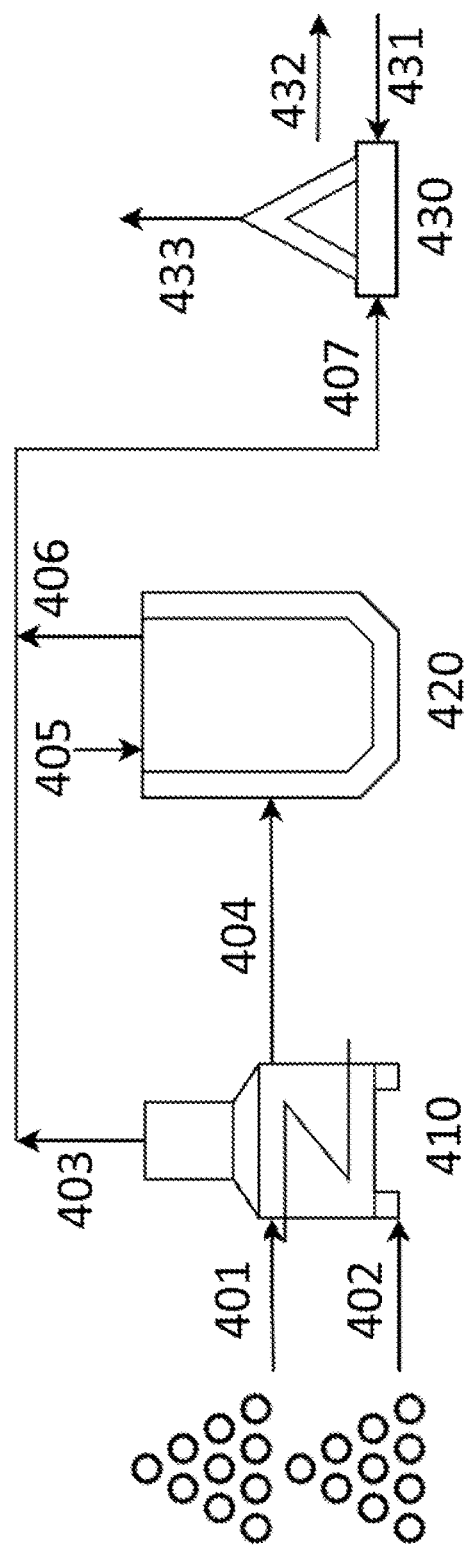
FIG. 4A illustrates a simplified process flow diagram (PFD) for a conventional steel manufacturing process.
Figure 4B:
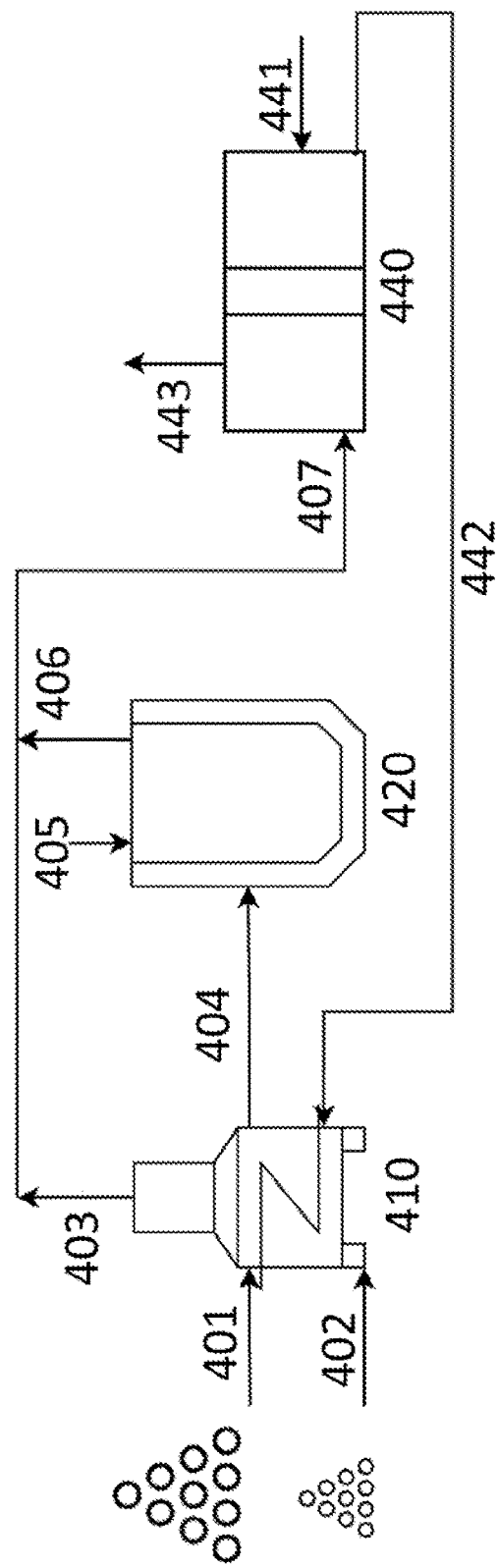
FIG. 4B illustrates a simplified PFD for steel manufacturing using an integrated hydrogen production system having a transformative electrochemical process for $H_2$ production, which hydrogen used in a blast furnace (BF) is able to increase efficiency and reduce atmospheric $CO_2$ emissions, according to an embodiment of this disclosure.

FIG. 4A illustrates a typical steel manufacturing process. Iron ores (401) and coke (402) are sent to a blast furnace (BF, 410) to produce pig iron (404), which is sent to a basic oxygen furnace (BOF, 420) with oxygen influx (405) to convert pig iron to steel. CO and $CO_2$ are produced from both the BF and the BOF. CO and $CO_2$ (403, 406, 407) are sent to a steam boiler (430) to generate steam (432) from water with air (431) as the oxidant. $CO_2$ and $N_2$ are emitted as waste gases (433) from the steam boiler. In contrast, FIG. 4B illustrates a simplified PFD for steel manufacturing using an integrated hydrogen production system, wherein the steam boiler 430 in FIG. 4A is replaced with an EC reactor/gas producer 440 in FIG. 4B. This reactor/producer has a transformative electrochemical process for $H_2$ production, which hydrogen (442) is used in the blast furnace (BF, 410) to increase efficiency and reduce atmospheric $CO_2$ emissions, according to an embodiment of this disclosure. As shown in FIG. 4B, the $CO/CO_2$ streams (403, 406, 407) from the BF and the BOF are sent to the EC reactor/gas producer (440) as fuel on the anode side. Steam (441) is sent to the EC reactor/gas producer 440 on the cathode side. The anode product gas (or anode exhaust, 443) is ready for carbon capture to sequester $CO_2$. The cathode product gas (or cathode exhaust, 442) is dehydrated, and the produced hydrogen is sent to the BF to reduce iron ore. The hydrogen used in the BF reduces coke requirements, resulting in >11 tons of $CO_2$ emissions reduced per ton of $H_2$ produced.

The CO-rich off-gases from BF's and/or BOF's (e.g., having 50%-90% of CO content) is well suited to be used with the EC reactor of this disclosure. The EC reactor has no or minimal need of supplemental electricity or supplemental fuel. In particular, this integrated process/system converts CO in the BF and BOF gases into high-purity $CO_2$ without the addition of $N_2$, resulting in an exhaust stream of sufficient $CO_2$ purity to enable economic sequestration of the $CO_2$. For example, seventeen of the largest eighteen steel plants in the U.S. with BOF's are directly above or near saline aquifers suitable for $CO_2$ sequestration. The potential emissions reduction from $CO_2$ sequestration is estimated to range from 30 to 90 tons of $CO_2$ per ton of $H_2$ produced for BOF's and BF's, respectively. Deploying this technology in the top 15 $CO_2$ emitting steel plants in the U.S. would result in the elimination and/or sequestration of >20 million tons of $CO_2$/year. Using waste streams from BOF's & BF's to reduce the energy content required to manufacture iron and steel, also improves the overall energy efficiency of manufacturing.

It is to be understood that this disclosure describes exemplary embodiments for implementing different features, structures, or functions of the invention. Exemplary embodiments of components, arrangements, and configurations are described to simplify the present disclosure; however, these exemplary embodiments are provided merely as examples and are not intended to limit the scope of the invention. The embodiments as presented herein may be combined unless otherwise specified. Such combinations do not depart from the scope of the disclosure.

Additionally, certain terms are used throughout the description and claims to refer to particular components or steps. As one skilled in the art appreciates, various entities may refer to the same component or process step by different names, and as such, the naming convention for the elements described herein is not intended to limit the scope of the invention. Further, the terms and naming convention used herein are not intended to distinguish between components, features, and/or steps that differ in name but not in function.

While the disclosure is susceptible to various modifications and alternative forms, specific embodiments thereof are shown by way of example in the drawings and description. It should be understood, however, that the drawings and detailed description are not intended to limit the disclosure to the particular form disclosed, but on the contrary, the intention is to cover all modifications, equivalents and alternatives falling within the spirit and scope of this disclosure.

What is claimed is:

1. A method of producing hydrogen comprising introducing a metal smelter effluent gas or a basic oxygen furnace (BOF) effluent gas or a mixture thereof into an electrochemical (EC) reactor, wherein the EC reactor comprises a mixed-conducting membrane.

2. The method of claim 1 comprising introducing steam into the EC reactor on one side of the mixed-conducting membrane, wherein the effluent gas is on the opposite side of the mixed-conducting membrane, wherein the effluent gas and the steam are separated by the mixed-conducting membrane and do not come in contact with each other.

3. The method of claim 1, wherein the EC reactor comprises an anode on the effluent gas side and a cathode on the steam side, wherein the anode and the cathode are separated by the mixed-conducting membrane and are in contact with the mixed-conducting membrane respectively.

4. The method of claim 2, wherein the anode and the cathode are separated by the mixed-conducting membrane and are both exposed to a reducing environment.

5. The method of claim 3, wherein the anode and the cathode comprise Ni or NiO and a material selected from the group consisting of yttria-stabilized zirconia (YSZ), gadolinium-doped ceria (CGO), samaria-doped ceria (SDC), scandia-stabilized zirconia (SSZ), lanthanum strontium gallate magnesite (LSGM), and combinations thereof.

6. The method of claim 3, wherein at least a portion of a cathode exhaust gas from the EC reactor is recycled to enter the EC reactor on the cathode side of the mixed-conducting membrane.

7. The method of claim 1, wherein the mixed-conducting membrane comprises an electronically conducting phase containing doped lanthanum chromite or an electronically conductive metal or combination thereof; and wherein the membrane comprises an ionically conducting phase containing a material selected from the group consisting of gadolinium or samarium doped ceria, yttria-stabilized zirconia (YSZ), lanthanum strontium gallate magnesite (LSGM), scandia-stabilized zirconia (SSZ), Sc and Ce doped zirconia, and combinations thereof.

8. The method of claim 7, wherein the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, Co, Ru, or combinations thereof.

9. The method of claim 1, wherein the mixed-conducting membrane comprises cobalt-doped CGO (CoCGO).

10. The method of claim 1, wherein the mixed-conducting membrane comprises LST (lanthanum-doped strontium titanate)-YSZ or LST-SSZ.

11. The method of claim 1, wherein the reactor comprises no interconnect.

12. The method of claim 2, wherein the steam is reduced to hydrogen on the cathode side.

13. The method of claim 1, wherein the effluent gas comprises CO and $CO_2$, and wherein the mole ratio of $CO/CO_2$ is no less than 1/5, or no less than 1/4, or no less than 1/3.

14. An integrated hydrogen production system comprising a metal smelter or a basic oxygen furnace (BOF) and an electrochemical (EC) reactor comprising a mixed conducting membrane that is both ionically and electronically conductive, wherein the reactor is capable of performing water gas shift reactions electrochemically, wherein electrochemical water gas shift reactions involve the exchange of an ion through the membrane, include forward water gas shift reactions, or reverse water gas shift reactions, or both, wherein the reactor is configured to receive effluent gas from the metal smelter or the BOF or both.

15. The system of claim 14, wherein the reactor comprises first and second porous electrodes that comprise metallic phase and ceramic phase, wherein the metallic phase is electronically conductive, and wherein the ceramic phase is ionically conductive.

16. The system of claim 15, wherein the porous electrodes have no current collector attached.

17. The system of claim 15, wherein the porous electrodes are separated by the mixed conducting membrane and are both exposed to a reducing environment.

18. The system of claim 14 comprising a gas holder between the reactor and the metal smelter or the BOF, wherein the gas holder is configured to receive effluent gas from the metal smelter or the BOF or both and introduce the effluent gas to the reactor.

19. The system of claim 15 comprising a steam generator, wherein the first porous electrode is configured to receive steam from the steam generator and the second porous electrode is configured to receive the effluent gas, wherein the steam and the effluent gas are separated by the mixed conducting membrane and do not come in contact with each other.

* * * * *

UNITED STATES PATENT AND TRADEMARK OFFICE
CERTIFICATE OF CORRECTION

PATENT NO. : 12,091,758 B2
APPLICATION NO. : 17/741587
DATED : September 17, 2024
INVENTOR(S) : Nicholas Farandos, Matthew Dawson and Jin Dawson Page 1 of 1

It is certified that error appears in the above-identified patent and that said Letters Patent is hereby corrected as shown below:

In the Claims

Column 14, Claim 3, Line 36, "The method of claim 1," should read -- The method of claim 2, --.

Column 14, Claim 4, Line 41, "The method of claim 2," should read -- The method of claim 3, --.

Signed and Sealed this
Fifteenth Day of October, 2024

Katherine Kelly Vidal
*Director of the United States Patent and Trademark Office*